(12) United States Patent
Galit

(10) Patent No.: US 8,429,074 B2
(45) Date of Patent: Apr. 23, 2013

(54) PRIVATE LABEL PROMOTION CARD SYSTEM, PROGRAM PRODUCT, AND ASSOCIATED COMPUTER-IMPLEMENTED METHODS

(71) Applicant: Metabank, Sioux Falls, SD (US)

(72) Inventor: Scott H. Galit, New York, NY (US)

(73) Assignee: Metabank, Sioux Falls, SD (US)

( * ) Notice: Subject to any disclaimer, the term of this patent is extended or adjusted under 35 U.S.C. 154(b) by 0 days.

(21) Appl. No.: 13/668,422

(22) Filed: Nov. 5, 2012

(65) Prior Publication Data

US 2013/0066702 A1 Mar. 14, 2013

Related U.S. Application Data

(63) Continuation of application No. 12/338,497, filed on Dec. 18, 2008, now Pat. No. 8,306, 912.

(60) Provisional application No. 61/014,950, filed on Dec. 19, 2007.

(51) Int. Cl.
*G06Q 40/00* (2012.01)

(52) U.S. Cl.
USPC .............................. 705/40; 705/39

(58) Field of Classification Search ............... 705/35–45
See application file for complete search history.

(56) References Cited

U.S. PATENT DOCUMENTS

| | | | | |
|---|---|---|---|---|
| 5,893,907 A | * | 4/1999 | Ukuda | 705/35 |
| 6,000,608 A | * | 12/1999 | Dorf | 235/380 |
| 6,450,407 B1 | | 9/2002 | Freeman et al. | |
| 7,954,704 B1 | * | 6/2011 | Gephart et al. | 235/380 |
| 2002/0055909 A1 | * | 5/2002 | Fung et al. | 705/42 |
| 2005/0289044 A1 | | 12/2005 | Breslin et al. | |
| 2006/0169784 A1 | | 8/2006 | Collins et al. | |
| 2008/0052224 A1 | | 2/2008 | Parker | |
| 2008/0103968 A1 | | 5/2008 | Bies et al. | |
| 2008/0162337 A1 | | 7/2008 | Greenland et al. | |
| 2010/0076836 A1 | | 3/2010 | Giordano et al. | |
| 2011/0093323 A1 | | 4/2011 | Prus et al. | |
| 2011/0112957 A1 | | 5/2011 | Ingram et al. | |

OTHER PUBLICATIONS

Notice of Allowance for co-pending U.S. Appl. No. 12/417,162 dated Oct. 1, 2012.
Office Action for co-pending U.S. Appl. No. 13/214,126 date Oct. 4, 2012.

(Continued)

*Primary Examiner* — Charles Kyle
*Assistant Examiner* — Jennifer Liu
(74) *Attorney, Agent, or Firm* — Bracewell & Giuliani LLP

(57) ABSTRACT

Embodiments of the present invention provide a private label promotion card as a bank product, being issued and managed by the bank and using an open payment network for purchase authorization and payments. A bank computer processes activation information for a promotion card and receives funds into an account at the bank on behalf of a retailer for payment for the promotion card, perhaps at a discount to a customer value of the promotion card. The bank computer authorizes purchase requests to use one or more activated promotion cards as payment for a consumer purchase from the retailer via an open payment network and transfers funds to the open payment network to satisfy the authorized consumer purchase. Upon expiration, the bank computer sweeps the account of the remaining value for expired promotion cards to thereby establish a credit for the bank.

17 Claims, 8 Drawing Sheets

OTHER PUBLICATIONS

Notice of allowance for co-pending U.S. Appl. No. 12/607,780 dated Oct. 9, 2012.
Final Office Action for co-pending U.S. Appl. No. 13/232,700 dated Oct. 12, 2012.
Office Action for co-pending U.S. Appl. No. 13/284,524 dated Oct. 15, 2012.
Notice of allowance for co-pending U.S. Appl. No. 13/601,724 dated Oct. 18, 2012.
Office Action for co-pending U.S. Appl. No. 13/536,765 dated Nov. 30, 2012.
Notice of Allowance for co-pending U.S. Appl. No. 13/282,186 dated Dec. 17, 2012.

* cited by examiner

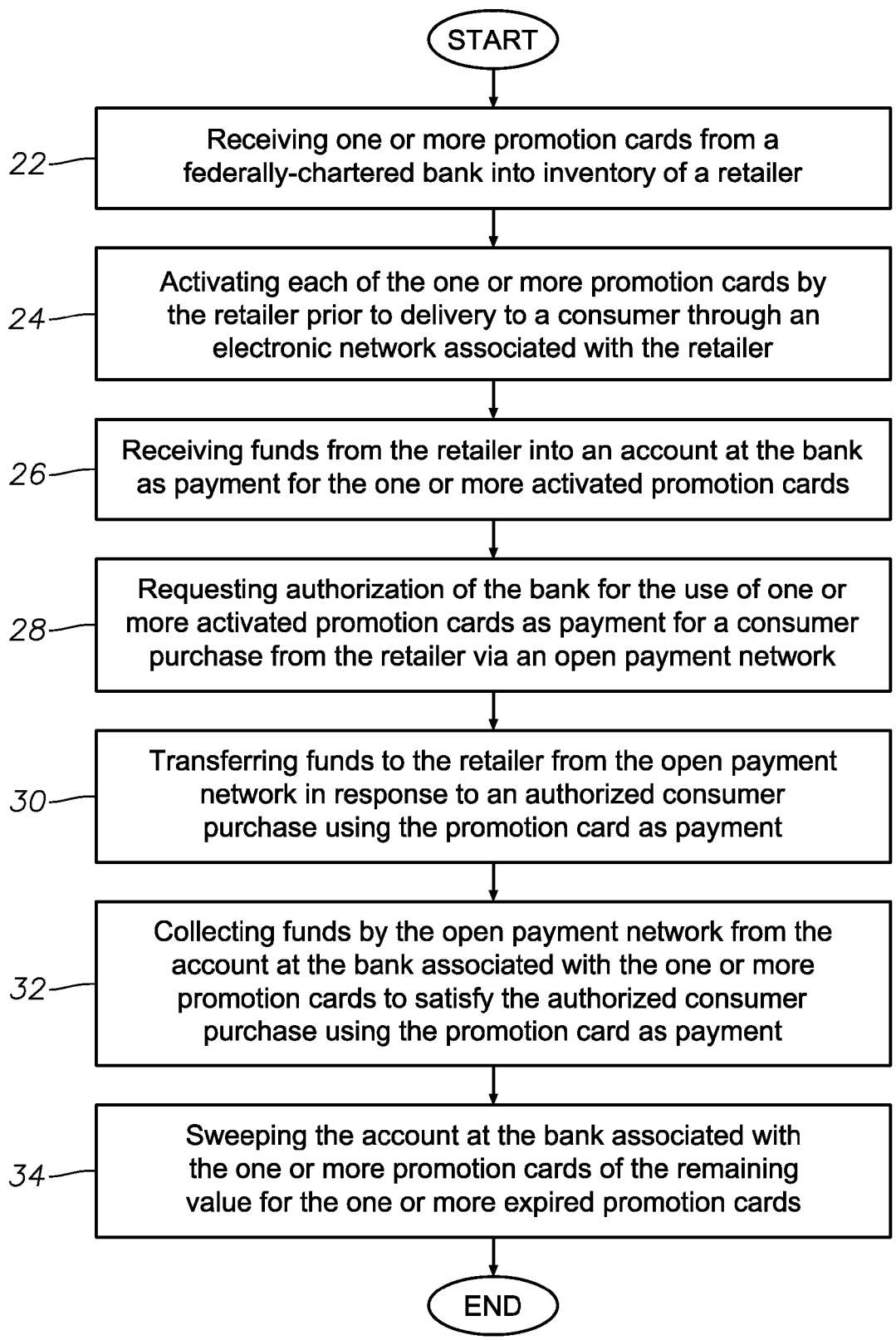

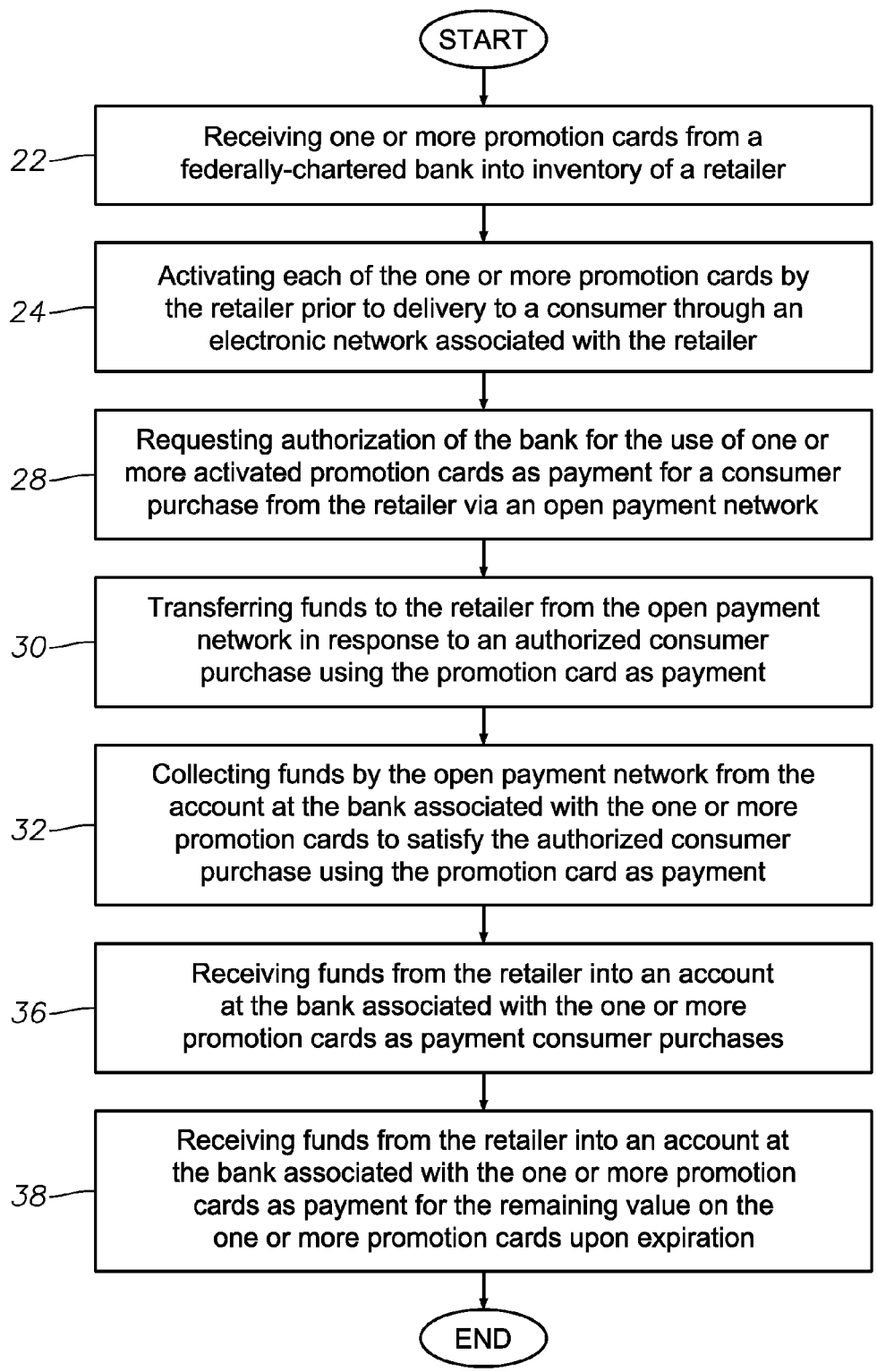

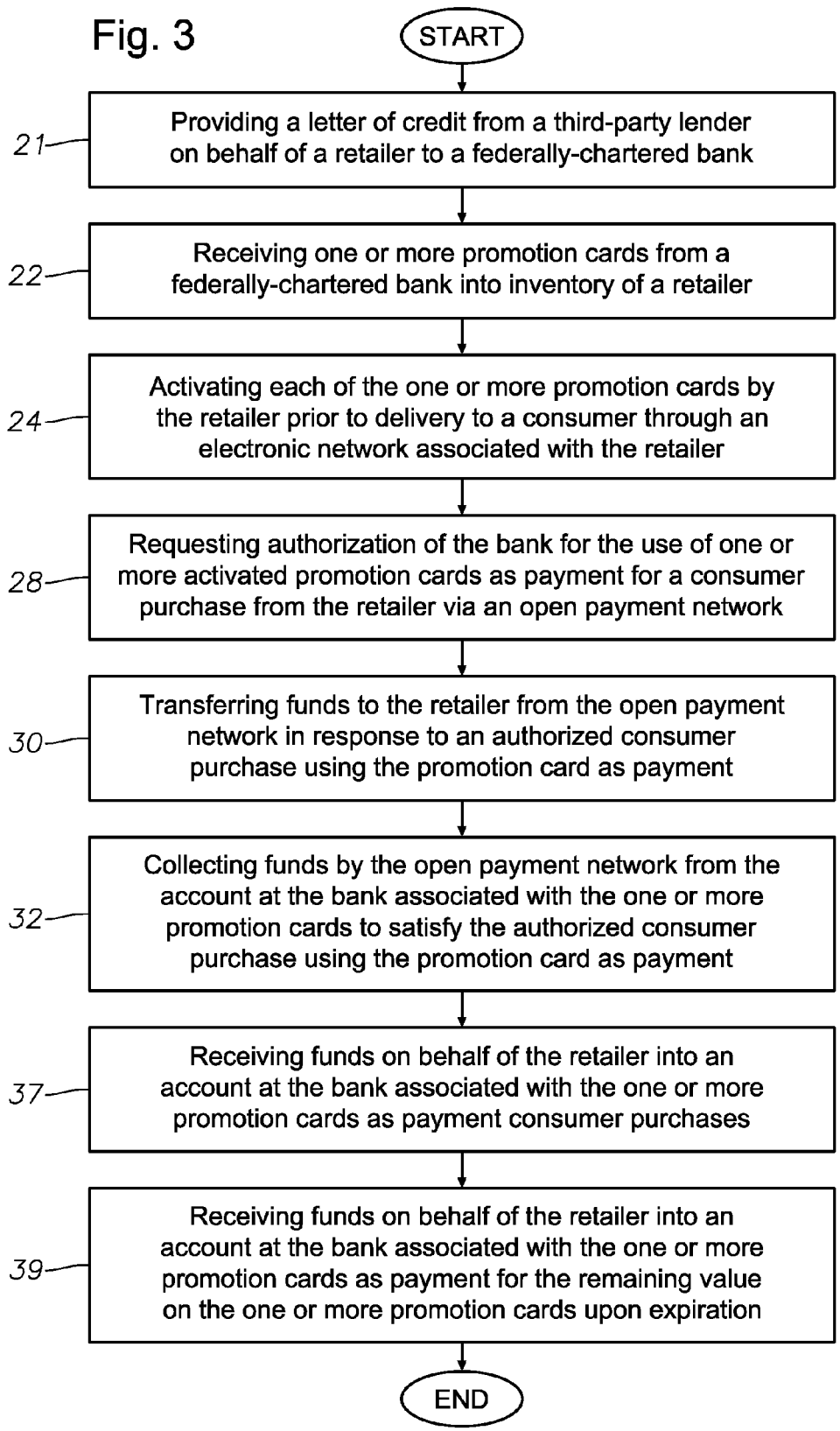

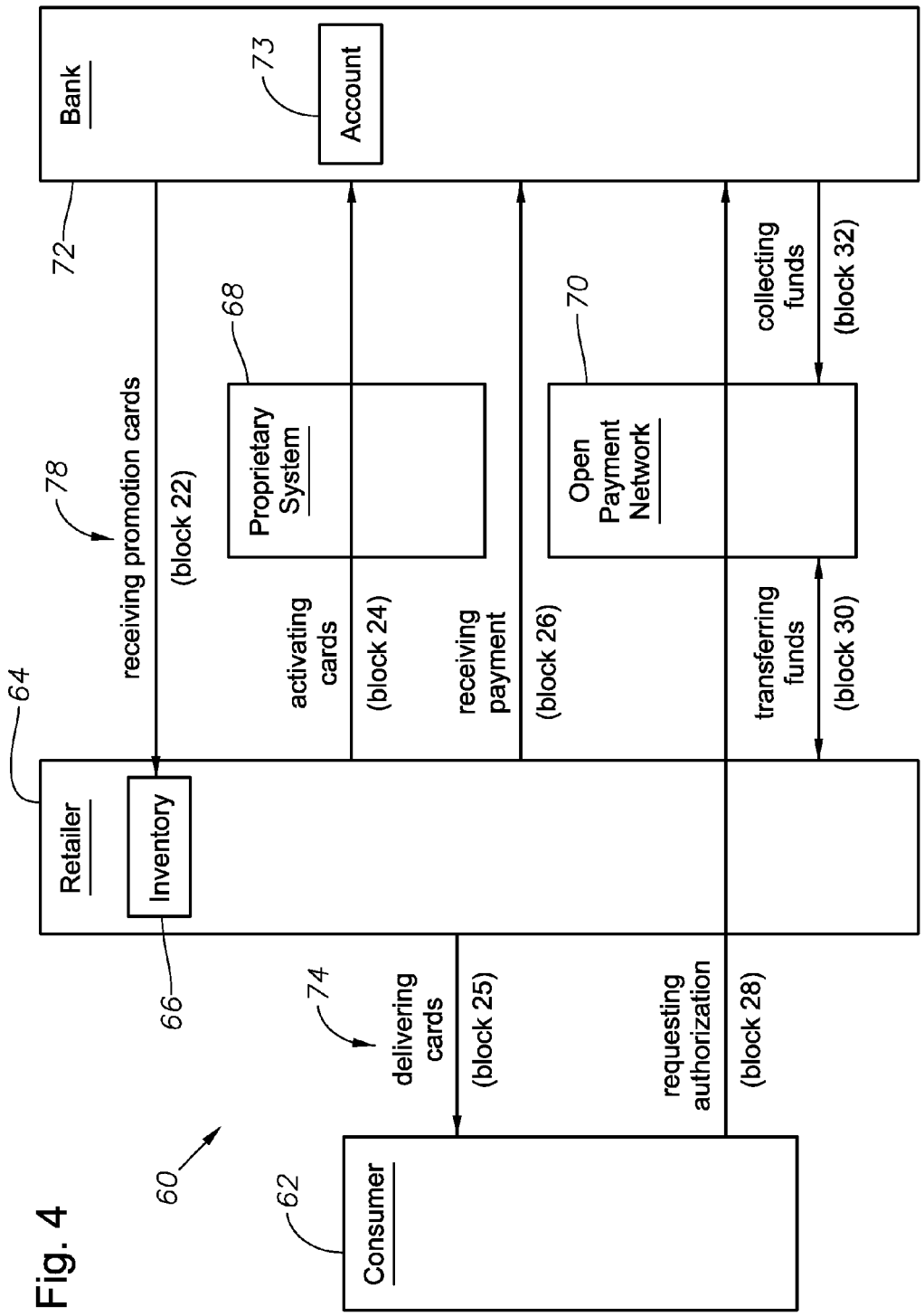

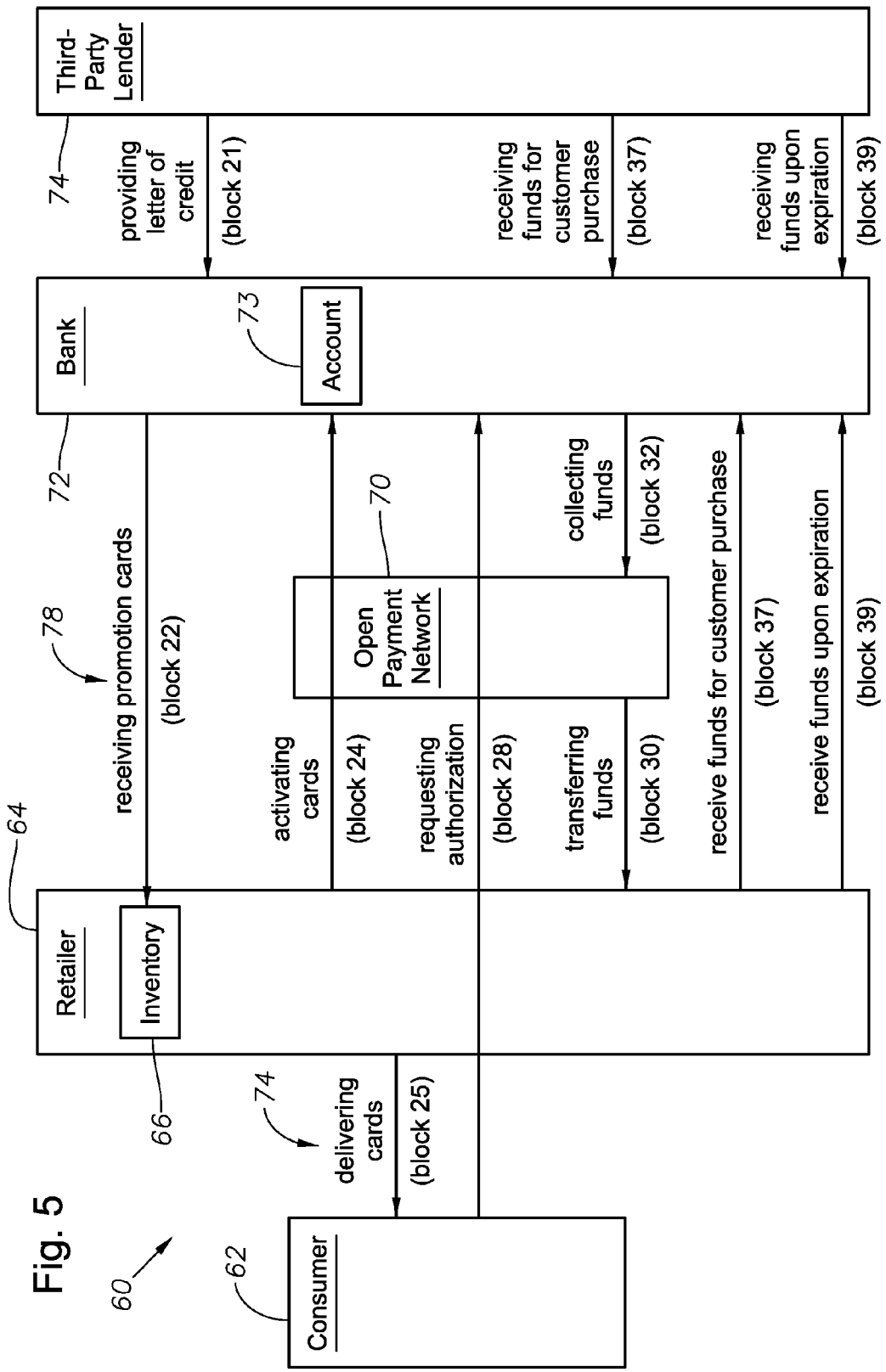

PRIVATE LABEL PROMOTION CARD SYSTEM, PROGRAM PRODUCT, AND ASSOCIATED COMPUTER-IMPLEMENTED METHODS

RELATED APPLICATIONS

The present application is a continuation of and claims priority to and the benefit of U.S. patent application Ser. No. 12/338,497, filed Dec. 18, 2008, titled "Private Label Promotion Card System, Program Product, and Associated Computer-Implemented Methods", which claims priority to and the benefit of U.S. Provisional Patent Application Ser. No. 61/014,950, titled "Private Label Promotion Card System, Program Product, and Associated Methods" filed Dec. 19, 2007, each incorporated herein by reference in their entirety. This application relates to U.S. patent application Ser. No. 12/338,540, titled "Private Label Promotion Card System, Program Product, and Associated Computer-Implemented Methods" filed Dec. 18, 2008, now U.S. Pat. No. 8,244,611, which issued Aug. 14, 2012, each incorporated herein by reference in their entirety.

BACKGROUND

Field of Invention

The present invention relates generally to the financial service and card product industries, and, more particularly, to systems, computer program products, and associated computer-implemented methods of providing rebates, in-store credit, and other promotions via a bank or private label promotion card, as well as a bank card product.

Background

One common and popular sales promotion today is the mail-in rebate. For example, a consumer reads in the newspaper about a promotion for a $40 manufacturer's mail-in rebate for a product that sells for $240. In fact, the promotion can advertise a price of "$200 after rebate." In turn, the consumer goes to a retailer, purchases the product for $240, and then mails in the rebate with proof of purchase. The consumer later receives a check or gift card for $40.

Long known in the art, a common sales promotion bundles in-store credit with a purchase. For example, a consumer hears a radio commercial offering $25 of in-store credit with any purchase of stereo equipment greater than $150. The consumer goes to the retailer, purchases stereo equipment for over $150 and receives with that purchase $25 of in-store credit. Rather than provide the in-store credit for use at the same time as the purchase of stereo equipment, the retailer typically provides the consumer a coupon or a store gift card providing in-store credit for use during a subsequent visit. Later the consumer returns to the retailer, presents the coupon or store gift card providing in-store credit, and receives $25 off a purchase.

Also, it has been known that banks offer and sell bank card products such as debit cards, credit cards, automatic teller machine (ATM) cards, gift or prepaid cards, and combinations thereof, e.g., ATM/debit card. Because of the convenience, flexibility, and value as a tool for promotion, cards are a common tool used by retailers millions of times a year to provide consumers with rebates, in-store credit, and promotions. Such cards are operated as store gift cards, operating on proprietary store gift card systems. Yet many of these cards are never redeemed and many of the accounting procedures for managing these card programs can be difficult, complex, or expensive. For example, retailers or other card issuers must comply with laws that govern gift cards and gift certificates that vary from state to state. Such laws typically determine whether a retailer is allowed to charge service fees against dormant accounts, what escheatment guidelines to follow, and such other requirements or guidelines as may be set forth in particular state laws. Such required action of the retailer or other card issuer makes the process more complex and, in some instances, burdensome or expensive. It is further known for banks to provide back-end financial processing, data processing, and account tracking services to various retailers to enhance business opportunities and relationships with retailers.

SUMMARY OF INVENTION

In view of the above, Applicant has recognized numerous problems with current offerings of rebates, in-store credit, and other promotions and one or more sources of these problems. For example, there are significant costs for issuing the cards and managing the transactions associated with retailer promotion cards. In addition, Applicant also recognizes that varied state laws and regulations are a source of problems with current solutions, including the management of escheatment. Escheatment involves the reversion of property to a state in the United States when there are no legal heirs or when personal property is presumed abandoned. Specifically, in the case of a gift certificate, often used as a promotional item in addition to its traditional use as a gift substitute, the retailer who offers the gift certificate may be required to carry on its financial balance sheet a liability in the event of an unredeemed gift certificate (which occurs quite frequently) until state law requires the retailer to turn over to the state the value of the gift certificate after a term for redemption, which, in some instances, can last for years. State law generally treats gift cards as gift certificates. Applicant recognizes that state escheatment laws and regulations result in, at least, two distinct problems. First, the cost and complexity of managing the escheatment process from state to state. Second, the long-term carrying of liabilities can have a negative effect on the balance sheet of the business offering the promotion, especially when it is carried on the books of the business, e.g., retailer, for a significant amount of time.

Accordingly, embodiments of the present invention provides a private label promotion card as a bank product to thereby offer consumers the same experience as today in dealing with a business, e.g., a product that can only be used at a specific retailer, and yet providing significant value to the offering businesses. Embodiments of a promotion card as defined herein, for example, include a rebate card, in-store credit card, and coupon-type card. According to embodiments of the present invention, it has been recognized that a private label promotion card can be offered, for example, by a bank, e.g., a federally-chartered bank, whose governing laws enable a consistent implementation nationally rather than subject to state banking laws and regulations, as a bank product or bank service product. A bank is an establishment for the custody, loan, exchange, or issue of money, for the extension of credit, and for facilitating the transmission of funds; a bank is typically a corporation operating under a charter from a government. Thus, the embodiments of the present invention provide a private label promotion card legally and economically distinct from others. Specifically, embodiments of the present invention include a promotion card whose value is managed by the bank offering the retailer promotion card. In addition, the retailer is able to avoid the long-term carrying of liabilities and the associated negative effects on the balance sheet, according to embodiments of the present invention.

The bank product or bank service product, according to embodiments of the present invention, has numerous other features and benefits, including being issued and managed by a bank, as opposed to being issued and managed by a retailer, mall operator, or manufacturer; use of an open payment network, e.g., VISA, MASTERCARD, DISCOVER, and AMERICAN EXPRESS networks, for purchase authorization and payments, rather than a proprietary or in-house system; and being corporately financed for promotional purposes, as opposed to being purchased by a consumer such as for gift purposes. Furthermore, one accounting feature that can be beneficial between the bank product according to embodiments of the present invention and others is that money and liability are transferred from the retailer to the bank in embodiments of the present invention, as compared to other known systems whereby money and liability stay with the retailer, for example, until usage and escheatment.

With the transfer of liability, embodiments of the present invention allow the retailer to purchase the promotion card at a discount to the face value. For example, funds being received from a retailer into a bank account associated with the one or more promotion cards as payment include an amount of funds less than the amount of funds associated with the promotion value, face value, rebate value, or other value to the consumer of the one or more cards by a consumer to thereby define a discount. That is, the bank can sell a promotion card with a face value of $50 to the retailer for some amount less than $50, according to embodiments of the present invention.

Moreover, embodiments of the present invention provide financing options to thereby enable the retailer to delay funding the bank until the consumer spends the money available on the retailer promotion card. According to embodiments of the present invention, this system can employ a bank-extended line of credit or a letter of credit from a third-party lender, whether arranged by the retailer or by the bank offering the promotion card.

Embodiments of the present invention, for example, include a system using the existing open payment network (including, for example, VISA or MASTERCARD networks), as understood by those skilled in the art, and existing point-of-sale (POS) infrastructure, as understood by those skilled in the art, to issue bank-managed, store-specific promotion cards. This embodiment of a system, for example, provides consumers with gift-card functionality comparable to a retailer-managed product of today. The bank manages the product and services of the consumers, however, rather than the retailer, according to the embodiments of the present invention.

Embodiments of the present invention also include software, or program product stored on a tangible computer memory media as a set of instructions, operable on a computer to cause the instructions to be executed by the computer, and used to manage a purchase transaction. A consumer, for example, presents the card at the POS. Then a clerk at the retailer or the consumer swipes the card, making an authorization request of an open payment network. The network routes the request to the bank providing the promotion card and services. The bank then processes the request and provides the authorization response via the open payment network to the acquiring processor. As understood by those skilled in the art, Automated Clearing House (ACH) is the name of an electronic network for financial transactions in the United States, regulated by the Federal Reserve. Embodiments also can use standard ACH file payments or wire transfers to settle accounts with the retailer and the open payment network.

Embodiments of the present invention include a computer-implemented method of funding a promotion card. The computer-implemented method, for example, includes receiving one or more promotion cards from a federally-chartered bank into inventory of a retailer. According to the embodiments of the present invention, the promotion cards are bank products subject to federal banking laws and regulations. The computer-implemented method continues with the activation of each of the one or more promotion cards by the retailer prior to delivery to a consumer. Next, funds are received from the retailer into an account at the bank associated with the one or more promotion cards as payment for the one or more activated promotion cards via an ACH file or wire transfer. Later, when a consumer attempts to make a purchase from the retailer using one or more activated promotion cards as payment, authorization is requested of the bank via an open payment network. The retailer is transferred funds from the open payment network in response to the consumer purchase. The open payment network collects funds from the account at the bank associated with the promotion cards to satisfy the consumer purchase using the promotion card as payment. An additional embodiment of a method, for example, can include the retailer mailing the promotion card to consumers in a way related to how rebate fulfillment is managed today as understood by those skilled in the art.

In addition, embodiments of the present invention provide, for example, a system for providing a promotion card such as to a retailer from a bank. The system can include a first computer associated with a retailer defining a retailer computer. The retailer computer is positioned to manage inventory of one or more promotion cards received from a bank and to activate the one or more promotion cards through an electronic network associated with the retailer, as understood by those skilled in the art. A second computer associated with the bank defines a bank computer which is positioned to manage an account associated with the one or more promotion cards. The system can also include a POS terminal having a processor defining an acquiring processor, and the POS terminal being associated with the retailer. An open payment network can be in communication with the retailer computer and the bank computer and positioned to receive authorization requests for a consumer purchase using one or more promotion cards as payment. The requests, for example, can be captured by the acquiring processor of the POS terminal associated with the retailer to thereby route the request to the bank computer through the open payment network. The open payment network, as understood by those skilled in the art, also can receive an authorization response from the bank computer, transfer funds to the retailer from the open payment network in response to an authorized consumer purchase using the promotion card as payment, and collect funds from the account at the bank associated with the one or more promotion cards to satisfy the authorized consumer purchase using the promotion card as payment. The system can further include a computer program product associated with the bank computer, stored on a tangible computer memory media, operable on a computer, and used to manage promotion card transactions. The computer program product has a set of instructions that, when executed by the computer, cause the computer to perform the operations of: processing activation information of one or more promotion cards from the retailer computer, authorizing purchase requests to use of one or more activated promotion cards as payment for a consumer purchase from the retailer via an open payment network, transferring funds to the open payment network from the account at the bank associated with the one or more promotion cards to satisfy the authorized consumer purchase using the promotion card as payment, and receiving funds into an account at the bank associated with the promotion cards on behalf of the retailer for one or more of the following: payment for the one or more activated promotion cards, payment for consumer purchases using one or more promotion cards, and payment for the value remaining on the one or more promotion cards upon expiration. The instructions can also include debiting from the account at the bank associated with the one or more promotion cards of the remaining value for the one or more expired promotion cards to thereby establish a credit for the bank. That is, the instructions can include sweeping the account of the funds associated with the expired promotion cards.

In addition, embodiments of the present invention include systems, program products, and associated computer-implemented methods of providing rebates, in-store credit, and other promotions via a bank card as will be understood by those skilled in the art, providing consumers convenience and retailers a private label promotion card legally and economically distinct from existing solutions, including improved funding options.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 1 is a schematic flow diagram of a computer-implemented method of funding a promotion card according to an embodiment of the present invention;

FIG. 2 is a schematic flow diagram of a computer-implemented method of funding a promotion card according to another embodiment of the present invention;

FIG. 3 is a schematic flow diagram of a computer-implemented method of funding a promotion card according to yet another embodiment of the present invention;

FIG. 4 is a schematic block diagram of a system to provide promotion cards according to an embodiment of the present invention;

FIG. 5 is a schematic block diagram of a system to provide promotion cards according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 8:
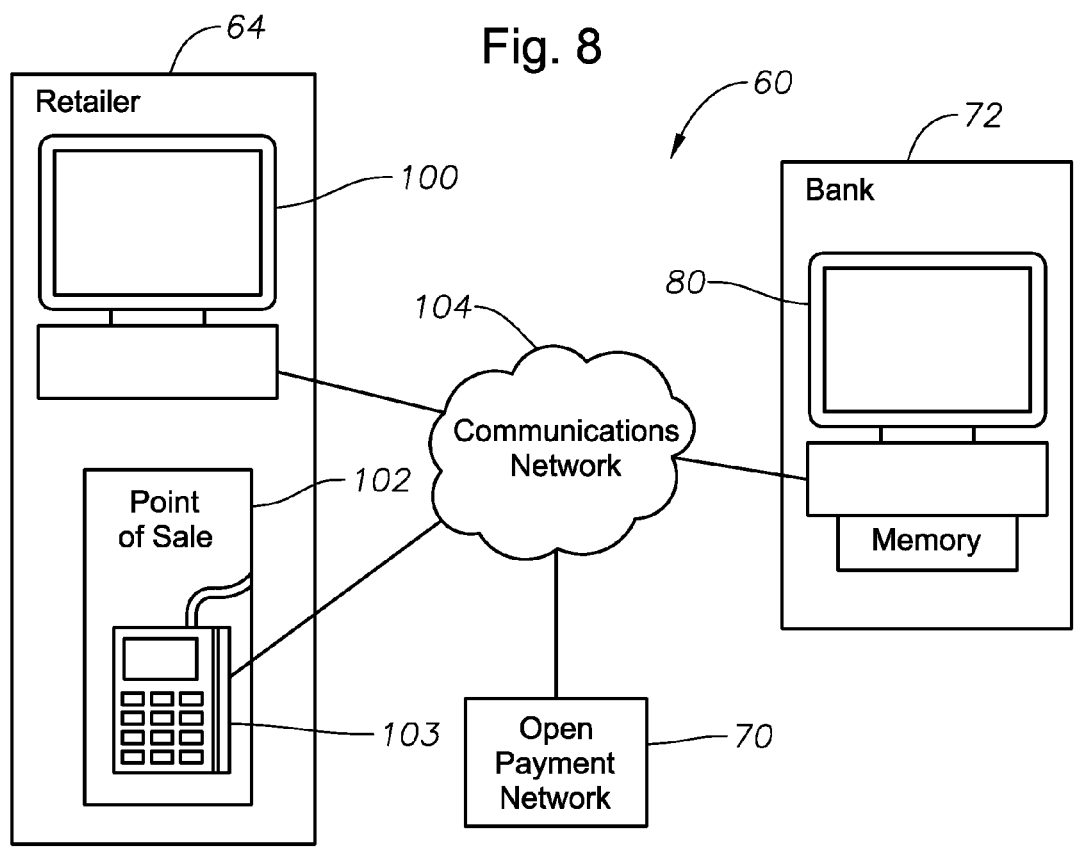
FIG. 8 is a schematic block diagram of a system to provide promotion cards according to an embodiment of the present invention.

Embodiments of the present invention, for example, provide for various ways to fund a promotion card. Embodiments of a promotion card as defined herein, for example, include a gift card, a rebate card, an in-store credit card, and a coupon-type card. The structures of various types of specific prepaid cards, e.g., magnetic stripe, type of material, are well known to those skilled in the art and can be used with embodiments of the present invention. For example, as illustrated in FIGS. 1, 4, and 8, embodiments of the present invention provide for a retailer 64 to exchange funds for promotion cards 78 to a bank 72. The bank 72 can offer a discount to the retailer 64 such that the amount of funds paid by the retailer is less than the amount of funds associated with the consumer value, or face value, of the one or more promotion cards 78 (block 26). In addition, the bank manages the processing of the promotion card (block 28), absorbs the liability that all of the promotion cards will be redeemed, and absorbs the risk associated with any value of promotion cards upon its expiration (block 34), according to embodiments of the present invention. For the retailer promotion cards, the usage of the card can either be limited to usage at that specific retailer by restrictions managed by the bank authorization system or can be made available at any retailer accessible through the complete open payment network.

In another example, as illustrated in FIGS. 3, 5, and 8, embodiments of the present invention provide for a retailer 64 to receive promotion cards 78 from a bank 72. The retailer 64 pays no money upfront and pays the bank 72 only in response to a purchase by a consumer 62 using a promotion card (block 37) or upon expiration of one or more promotion cards (block 39). In addition, a third-party lender 74 can provide a letter of credit to the bank 72 on behalf of the retailer 64 (block 21) and the retailer can pay the bank in response to a purchase by a consumer 62 using a promotion card 78 (block 37) or upon expiration of one or more promotion cards (block 39), should the funds not yet have been paid by the retailer.

FIG. 1 illustrates a computer-implemented method of funding a promotion card according to an embodiment of the present invention. The computer-implemented method, for example, can begin with receiving one or more promotion cards from a bank, e.g., a federally-chartered bank, a state bank, or another type of bank entity, into inventory of a retailer (block 22). According to the embodiments of the present invention, for example, the promotion cards advantageously can be bank products subject to federal banking laws and regulations, as will be understood by those skilled in the art, so that a federally-chartered bank can offer features not available to other types of banking entities. For example, a bank organized under a federal charter is regulated by federal banking laws that can and do preempt state laws, including, for example, state escheatment laws, allowing a consistent implementation of a promotion card nationally rather than patchwork solutions with different features for the promotion card depending on each state. The computer-implemented method continues with the activation of each of the one or more promotion cards by the retailer prior to delivery to a consumer (block 24), including the bank computer processing the activation information for the promotion cards. Next, as illustrated, funds are received from the retailer into an account at the bank associated with the one or more promotion cards as payment for the activated one or more promotion cards (block 26). Later, when a consumer attempts to make a purchase from the retailer using one or more activated promotion cards as payment, authorization is requested of the bank via an open payment network (block 28), for example, as understood by those skilled in the art. Funds can be deducted funds from a promotion card, and a value remaining on the promotion card for a next, future, or other transaction can be indicated. The retailer is transferred funds through the open payment network in response to the consumer purchase (block 30), as understood by those skilled in the art. The open payment network is used to send or transfer funds from the account at the bank associated with the one or more promotion cards to satisfy the consumer purchase using one or more promotion cards as payment (block 32). That is, the bank computer transfers funds to and through the open payment network from the account at the bank associated with the one or more promotion cards, e.g., an electronic funds transfer, to satisfy the authorized consumer purchase using the one or more activated promotion cards as payment. Upon expiration of a promotion card, the account at the bank associated with the one or more promotion cards is swept of the remaining value for the one or more expired promotion cards (block 34). That is, the remaining value is debited from the account.

FIG. 2 illustrates a computer-implemented method of funding a promotion card according to another embodiment of the present invention. The computer-implemented method, for example, can begin with receiving one or more promotion cards from a federally-chartered bank into inventory of a retailer (block 22), so that the one or more cards are identified as financial assets of the retailer. According to the embodiments of the present invention, the promotion cards are bank products subject to federal banking laws and regulations. The computer-implemented method continues with the activation of each of the one or more promotion cards by the retailer prior to delivery to a consumer through an electronic network associated with the retailer (block 24), including the bank computer processing the activation information for the promotion cards. Later, when a consumer attempts to make a purchase from the retailer using one or more activated promotion cards as payment, authorization is requested of the bank via an open payment network (block 28), as understood by those skilled in the art. Funds can be deducted funds from a promotion card, and a value remaining on the promotion card for a next, future, or other transaction can be indicated. The retailer is transferred funds from the open payment network in response to the consumer purchase (block 30), as understood by those skilled in the art. The open payment network collects funds from the account at the bank associated with the one or more promotion cards to satisfy the consumer purchase using one or more promotion cards as payment (block 32). That is, the bank computer transfers funds to the open payment network from the account at the bank associated with the one or more promotion cards to satisfy the authorized consumer purchase using the one or more activated promotion cards as payment. Next, as illustrated, funds are received from the retailer into an account at the bank associated with the one or more promotion cards as payment for consumer purchases (block 36). Upon expiration of a promotion card, funds are received from the retailer into an account at the bank associated with the one or more promotion cards as payment for the value remaining on the promotion cards upon expiration (block 38).

FIG. 3 illustrates a computer-implemented method of funding a promotion card according to yet another embodiment of the present invention. The computer-implemented method illustrated in FIG. 3 shares many of the steps illustrated in FIG. 2; the computer-implemented method in FIG. 3, however, begins with providing a letter of credit, as understood by those skilled in the art, from a third-party lender on behalf of a retailer to a bank, e.g., a federally-chartered, state, or other bank (block 21). Later, funds are received on behalf of the retailer into an account at the bank associated with the one or more promotion cards as payment for consumer purchases (block 37). Upon expiration of a promotion card, funds are received on behalf of the retailer into an account at the bank associated with the one or more promotion cards as payment for the value remaining on the one or more promotion cards upon expiration (block 39). Note that unlike blocks 36 and 38, blocks 37 and 39, for example, allow for the funds to be received on behalf of the retailer to be provided under a letter of credit by the third-party lender due to, for example, account funds not being available or non-payment by the retailer.

For example, the letter of credit, as will be understood by those skilled in the art, is a technique or tool that guarantees the bank issuing the cards that should the retailer default, the bank that provides the letter of credit will provide the funds. In an embodiment, for example, the retailer may continue to make the payments to fund the spending. The letter of credit can be a way to allow the retailer to defer the funding because there is a third party guaranteeing the retailer funding. It will be understood by those skilled in the art, however, that other types of guarantees can be used as well that emulate or act as type of letter of credit or accomplish similar purposes to the letter of credit.

Embodiments of the present invention advantageously allow the retailer to purchase the promotion card at a discount to the face value. For example, funds being received from a retailer into a bank account associated with the one or more promotion cards as payment include an amount of funds less than the amount of funds associated with the promotion value, face value, rebate value, or other value to the consumer of the one or more cards by a consumer to thereby define a discount. That is, the bank can sell a promotion card with a face value of $50 to the retailer for some amount less than $50, according to embodiments of the present invention, as will be understood by those skilled in the art.

Embodiments of the present invention include both pre-denominated cards and variable denominated cards. That is, a pre-denominated card may have a predetermined or preselected amount of initial value, such as, $50 or $25, as understood by those skilled in the art. Variable denominated cards may instead be loading with any initial amount, such as, e.g., $17.63, or an amount within a range as understood by those skilled in the art. The retailer can offer, for example, a promotion card worth $25 of in-store credit with a purchase of $100 of merchandise; in addition, the retailer can also offer a promotion card worth 10% of any purchase, according to embodiments of the present invention.

Embodiments of the present invention also provide flexibility for the retailer to activate a promotion card through an open payment network or a proprietary system. An open payment network are designed and managed for interactions with third parties. As such, open payment networks provide standards, for example, for purchase authorizations and payments. These standards include, for example, interfaces, functionality, networking, hardware and software. For example, an open payment networks include, for example, VISA, MASTERCARD, DISCOVER, and AMERICAN EXPRESS networks. Those skilled in the art will understand that open payment networks can utilize and encompass numerous technologies, including, for example, the Internet, the World Wide Web, various computer networks and protocols, various wireless and satellite networks and systems, various telephone networks and systems, and point-of-sale terminals. In contrast, a proprietary system or closed or in-house system is managed privately; a proprietary system typically excludes or limits third parties interactions with the system, including, for example, exclusions or limitations imposed by software.

A system 60 to provide promotion cards 78, according to embodiments of the present invention, is also provided (see, e.g., FIG. 4). The system includes a retailer 64 being positioned to receive into inventory 66 promotion cards 78 from a bank 72 (block 22) and further being positioned to activate the promotion cards 78 prior to delivery to a consumer 62 through an electronic network associated with the retailer (block 24) via a proprietary system 68. According to embodiments of the present invention, the promotion cards 78 are bank products subject to federal banking laws and regulations and are redeemable only at the retailer 64. The system 60 also includes a bank computer 80 at the bank 72 being positioned to receive funds from the retailer into an account 73 at the bank 72 associated with the promotion cards via an ACH file or wire transfer (block 26) and further being positioned to receive an authorization request for the use of one or more activated promotion cards as payment for a consumer purchase from the retailer via an open payment network 70 (block 28). The system 60 further includes an open payment network 70 being positioned to communicate authorization requests for a consumer purchase using a promotion card as payment (block 28), to transfer funds to the retailer from the open payment network in response to an authorized consumer purchase using the promotion card as payment (block 30), and to collect funds from the account 73 at the bank associated with the one or more promotion cards to satisfy the authorized consumer purchase using the promotion card as payment (block 32). That is, the bank computer 80 transfers funds to the open payment network from the account 73 at the bank 72 associated with the one or more promotion cards to satisfy the authorized consumer purchase using the one or more activated promotion cards as payment.

FIG. 5 illustrates a system 60 to provide promotion cards 78 according to embodiments of the present invention. The system includes a retailer 64 being positioned to receive into inventory 66 promotion cards 78 from a bank 72 (block 22) and further being positioned to activate the promotion cards 78 prior to delivery to a consumer 62 through an electronic network associated with the retailer (block 24) via an open payment network 70. According to embodiments of the present invention, the promotion cards 78 are bank products subject to federal banking laws and regulations and are redeemable only at the retailer 64. The system 60 also includes a bank 72 being positioned to receive funds on behalf of the retailer, either from the retailer or a third-party lender 74 under a letter of credit, into an account 73 at the bank 72 for consumer purchases (block 37) and upon expiration of a promotion card (block 39) and further being positioned to receive an authorization request for the use of one or more activated promotion cards as payment for a consumer purchase from the retailer via an open payment network 70 (block 28). The system 60 further includes an open payment network 70 being positioned to communicate authorization requests for a consumer purchase using a promotion card as payment (block 28), to transfer funds to the retailer from the open payment network in response to an authorized consumer purchase using the promotion card as payment (block 30), and to collect funds from the account 73 at the bank associated with the one or more promotion cards to satisfy the authorized consumer purchase using the promotion card as payment (block 32). That is, the bank computer transfers funds to the open payment network from the account at the bank associated with the one or more promotion cards to satisfy the authorized consumer purchase using the one or more activated promotion cards as payment.

Figure 6A:
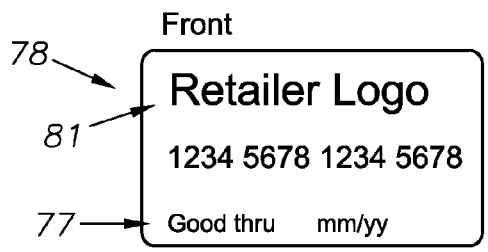
FIGS. 6A, 6B, and 6C are respective front, rear, and front elevational views of promotion card according to an embodiments of the present invention.
Figure 6B:
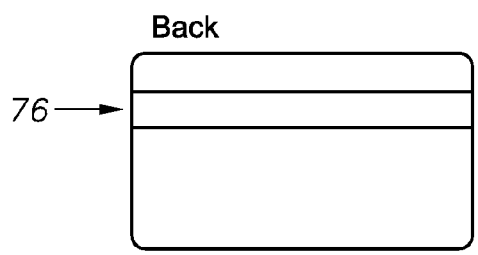
Figure 6C:
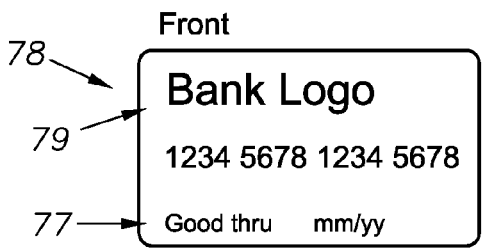

FIG. 6 illustrates an example promotion card 78 according to embodiments of the present invention, including preferably a magnetic strip 76 with account information and an expiration date 77. In addition, the one or more promotion cards 78 can have indicia 79, e.g., logo, slogans, source identifiers, thereon defining a bank brand and such brand being different than indicia 81, e.g., logo, slogans, source identifiers, of the retailer defining a retailer brand so that such one or more promotion cards each further defines a fully branded card. It will also be understood by those skilled in the art that the retailer brand may also be left off of the card if desired as an alternative embodiment of a promotion card.

Figure 7:
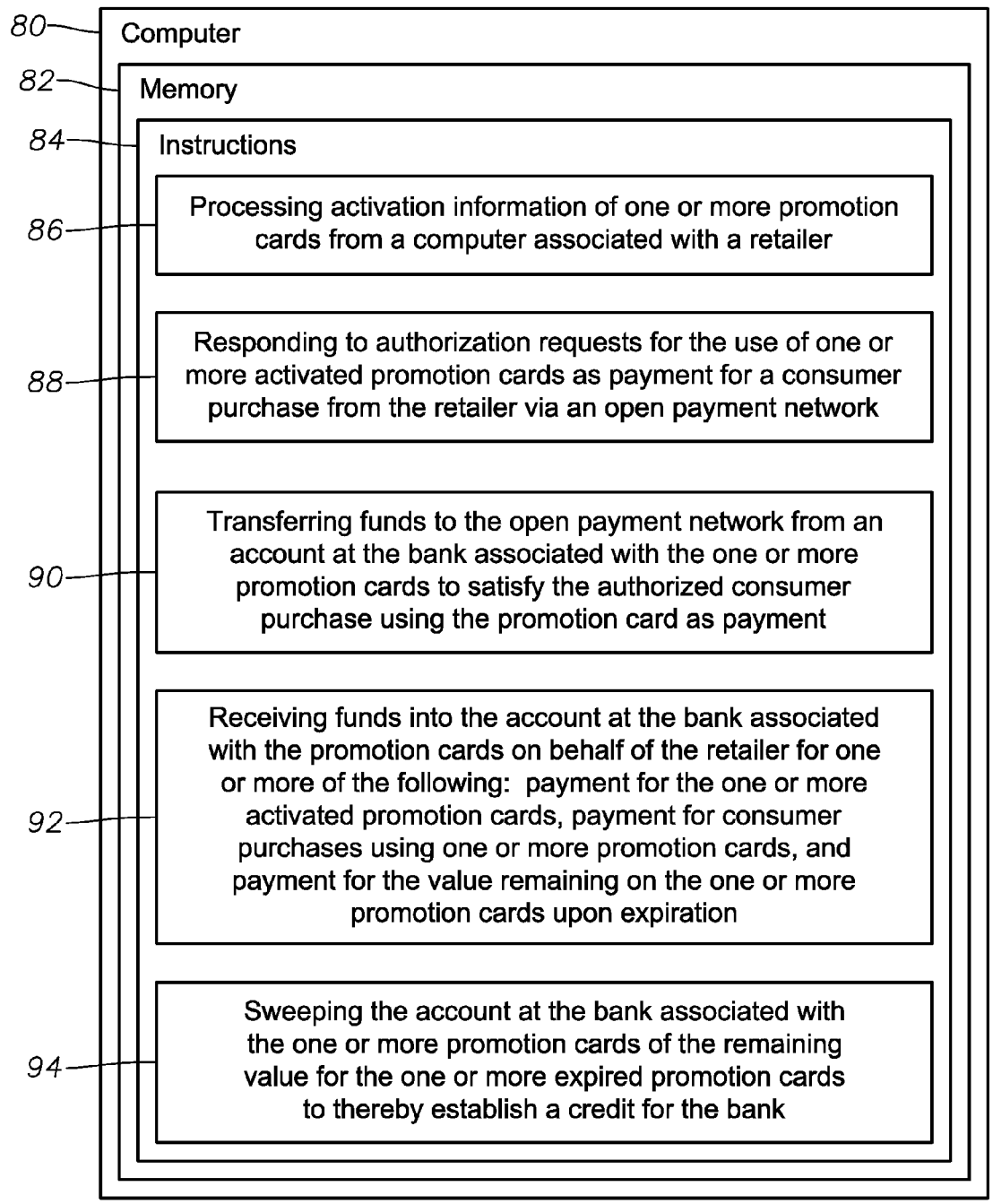
FIG. 7 is a partial schematic block diagram of computer product according to an embodiment of the present invention.

Embodiments of the present invention provide a system 60 to provide promotion cards 78, as illustrated in FIGS. 4, 5, and 8. The system, for example, includes a retailer 66 having a first computer, defining a retailer computer 100, to manage inventory 66 of one or more promotion cards 78 received from a bank 72 and to activate the one or more promotion cards 78 through an electronic or communications network 104, as understood by those skilled in the art. The retailer 64 also has a point-of-sale (POS) 102 terminal or interface including an acquiring processor 103, as understood by those skilled in the art. In addition, the system includes a bank 72 having a second computer, defining a bank computer 80, to manage an account 73 at the bank associated with the one or more promotion cards 78. The bank computer includes a program product in the form of instructions stored in memory and executable by the bank computer as illustrated in FIG. 7 and discussed below. The system further includes an open payment network 70 to receive authorization requests captured by an acquiring processor 103 for a purchase by a consumer 62 using one or more promotion cards 78 as payment, route the request to the bank computer 80, receive an authorization response from the bank computer 80, transfer funds to the retailer 64 from the open payment network 70 in response to an authorized consumer purchase using the promotion card 78 as payment, and collect funds from the account 73 at the bank associated with the one or more promotion cards 78 to satisfy the authorized consumer purchase using the promotion card as payment.

Embodiments of the present invention also include a computer program product, as illustrated in FIG. 7, stored on a tangible computer memory media 82, operable on a computer 80 associated with a bank, and used to manage promotion card transactions. The computer program product, for example, includes a set of instructions 84 that, when executed by the computer, cause the computer to perform the various operations, including processing activation information of one or more promotion cards from the retailer computer (block 86). The operations also include authorizing purchase requests for the use of one or more activated promotion cards as payment for a consumer purchase from the retailer via an open payment network (block 88), as understood by those skilled in the art, and transferring funds to and through the open payment network from the account at the bank associated with the one or more promotion cards to satisfy the authorized consumer purchase using the promotion card as payment (block 90). In addition, the operations further include receiving funds into an account at the bank associated with the promotion cards on behalf of the retailer for one or more of the following: payment for the one or more activated promotion cards, payment for consumer purchases using one or more promotion cards, and payment for the value remaining on the one or more promotion cards upon expiration (block 92). The operations, for example, also can include debiting the account at the bank associated with the one or more promotion cards of the remaining value for the one or more expired promotion cards to thereby sweep the account and establish a credit for the bank (block 94).

Figure 9:
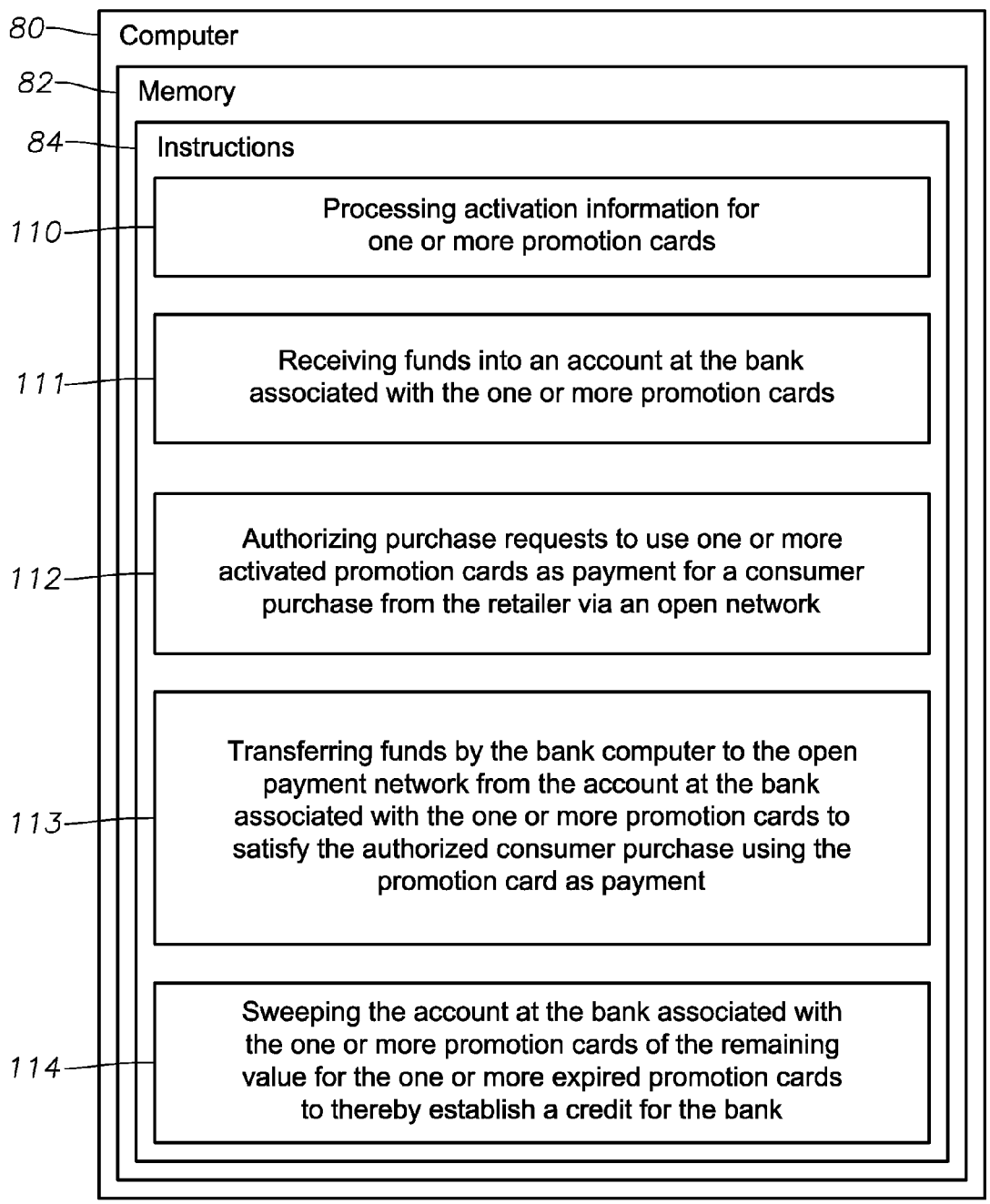
FIG. 9 is a schematic block diagram of a system to provide promotion cards according to an embodiment of the present invention.

Embodiments of the present invention also include a computer program product, as illustrated in FIG. 9, stored on a tangible computer memory media 82, operable on a computer 80 associated with a bank, and used to manage promotion card transactions. The computer program product, for example, includes a set of instructions 84 that, when executed by the computer, cause the computer to perform the various operations, including processing activation information of one or more promotion cards (block 110). The operations also include receiving funds into an account at the bank associated with the promotion cards on behalf of the retailer for payment for the one or more activated promotion cards (block 111). The operations further include authorizing purchase requests for the use of one or more activated promotion cards as payment for a consumer purchase from the retailer via an open payment network (block 112), as understood by those skilled in the art, and transferring funds to the open payment network from the account at the bank associated with the one or more promotion cards to satisfy the authorized consumer purchase using the promotion card as payment (block 113). In addition, the operations, for example, can include debiting the account at the bank associated with the one or more promotion cards of the remaining value for the one or more expired promotion cards to thereby sweep the account and establish a credit for the bank (block 114).

A person having ordinary skill in the art will recognize that various types of memory are readable by a computer such as described herein, e.g., retailer computer, bank computer, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer or a server. It will be understood by those skilled in the art that such media can be at other locations instead of or in addition to the bank computer or server to store program products, e.g., including software, thereon. Each of these computer servers, for example, can having one or more of these various types of memory as understood by those skilled in the art. In addition, the present invention is not described with reference to any particular programming language. It will be understood that a variety of programming languages may be used to implement the systems, program products, software, and computer-implemented methods as described herein.

Many modifications and other embodiments of the invention will come to the mind of those skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A computer-implemented method to manage a plurality of promotion cards, the method comprising:
    issuing, by a computer associated with a bank to define a bank computer, a plurality of cards configured to be used only with one of a plurality of retailers in association with one or more promotions to define a plurality of promotion cards, one or more of the plurality of retailers having an obligation to pay a predetermined amount to the bank for the plurality of promotion cards issued by the bank, each of the plurality of promotion cards having a redemption value;
    determining, by the bank computer, a receipt of an indication from one or more of a plurality of retail computers that one or more retail customers are eligible for the one or more promotions with one or more of the plurality of retailers, the bank having an obligation to fund from the bank's funds one or more authorized transactions associated with one or more of the plurality of promotion cards equal to or less than the redemption value;
    authorizing, by the bank computer, one or more transaction payment requests associated with one or more of the plurality of promotion cards issued by the bank computer to define one or more authorized transactions, the authorizing being responsive to a value of the one or more transaction payment requests being equal to or less than the redemption value of the one or more of the plurality of promotion cards;
    transferring, by the bank computer, funds in an amount of the value of the one or more transaction payments request from the bank computer to the one or more of the plurality of retail computers so that the bank meets the obligation to fund the one or more authorized transactions; and
    determining, by the bank computer, receipt of funds from the one or more of the plurality of retail computers, the funds being in an amount of the redemption value of the one or more of the plurality of promotion cards upon expiration to define a remaining redemption value.

2. A computer-implemented method of claim 1, wherein the one or more promotion is a coupon for one or more purchases with the one of the plurality of retailers so that the one or more of the plurality of promotion cards are coupon-type cards.

3. A computer-implemented method of claim 1, wherein the one or more promotion is a rebate for one or more purchases with the one of the plurality of retailers so that the one or more of the plurality of promotion cards are rebate-type cards.

4. A computer-implemented method of claim 1, wherein the authorizing and the transferring steps are made via an open payment network.

5. A computer-implemented method of claim 1, wherein the method further comprises:
    determining, by the bank computer, receipt of funds in a first amount from the one or more of the plurality of retail computers, the first amount being a value of the predetermined amount for the one or more of the plurality of promotion cards associated with the one or more authorized transactions; and
    wherein the funds received in the amount of the remaining redemption value is a second amount received from the one or more of the plurality of retail computers.

6. A computer-implemented method of claim 5, wherein the transferring the funds in the amount of the value of the one or more transaction payment request from the bank computer occurs prior to the receipt of funds in the first amount from the one or more of the plurality of retail computer.

7. A computer-implemented method of claim 1, wherein the predetermined amount is a predetermined discount amount that is less than the redemption value of the plurality of cards.

8. A computer-implemented method of claim 1, wherein the funds transferred by the bank computer in the amount of the one or more transaction payment request is greater than the predetermined amount of funds received for the one or more of the plurality of promotion cards.

9. A computer-implemented method of claim 1, wherein the remaining redemption value is zero.

10. A computer-implemented method of claim 1, wherein the authorizing and the transferring steps are made via an open payment network.

11. Non-transitory computer-readable medium having one or more computer programs stored therein operable by one or more computers associated with a bank to define one or more bank computers, the one or more computer programs comprising a set of instructions that, when executed by the one or more bank computers, cause the one or more bank computers to perform the operations of:
   issuing a plurality of cards configured to be used only with one of a plurality of retailers in association with one or more promotions to define a plurality of promotion cards, one or more of the plurality of retailers having an obligation to pay a predetermined amount to a bank for the plurality of promotion cards issued by the bank, each of the plurality of promotion cards having a redemption value;
   determining a receipt of an indication from one or more of a plurality of retail computers that one or more retail customers are eligible for the one or more promotions with one or more of the plurality of retailers, the bank having an obligation to fund from the bank's funds one or more authorized transactions associated with one or more of the plurality of promotion cards equal to or less than the redemption value;
   authorizing one or more transaction payment requests associated with one or more of the plurality of promotion cards issued by one or more bank computers to define one or more authorized transactions, the authorizing being responsive to a value of the one or more transaction payment requests being equal to or less than the redemption value of the one or more of the plurality of promotion cards;
   transferring funds in an amount of the value of the one or more transaction payments request from the bank computer to the one or more of the plurality of retail computers so that the bank meets the obligation to fund the one or more authorized transactions; and
   determining receipt of funds from the one or more of the plurality of retail computers, the funds being in an amount of the redemption value of the one or more of the plurality of promotion cards upon expiration to define a remaining redemption value.

12. Non-transitory computer readable medium as defined in claim 11, wherein the one or more computer programs further comprises instructions that, when executed by the one or more bank computers, cause the one or more bank computers to perform the operations of:
   determining receipt of funds in a first amount from the one or more of the plurality of retail computers, the first amount being a value of the predetermined amount for the one or more of the plurality of promotion cards associated with the one or more authorized transactions; and
   wherein the funds received in the amount of the remaining redemption value is a second amount received from the one or more of the plurality of retail computers.

13. Non-transitory computer readable medium as defined in claim 11, wherein the transferring the funds in the amount of the value of the one or more transaction payment request from the bank computer occurs prior to the receipt of funds in the first amount from the one or more of the plurality of retail computer.

14. Non-transitory computer-readable medium having one or more computer programs stored therein operable by one or more computers associated with a bank to define one or more bank computers, the one or more computer programs comprising a set of instructions that, when executed by the one or more bank computers, cause the one or more bank computers to perform the operations of:
   issuing a plurality of cards configured to be used only with one of a plurality of retailers in association with one or more promotions to define a plurality of promotion cards, the issuing being responsive to a receipt of a predetermined amount for the plurality of promotion cards, each of the plurality of promotion cards having a redemption value;
   determining a receipt of an indication from one or more of a plurality of retail computers that one or more retail customers are eligible for the one or more promotions with one or more of the plurality of retailers, a bank having an obligation to authorize authorized transactions equal to and less than the redemption value;
   authorizing one or more transaction payment requests associated with one or more of the plurality of promotion cards issued by one or more bank computers to define one or more authorized transactions, the authorizing being responsive to a value of the one or more transaction payment requests being equal to or less than the redemption value of the one or more of the plurality of promotion cards; and
   transferring funds in an amount of the value of the one or more transaction payments request from the bank computer to the one or more of the plurality of retail computers.

15. Non-transitory computer readable medium as defined in claim 14, wherein the one or more computer programs further comprises instructions that, when executed by the one or more bank computers, cause the one or more bank computers to perform the operations of:
   transferring funds remaining of the redemption value of the one or more of the plurality of promotion cards upon expiration to define a remaining redemption value into one or more accounts of the bank so that the remaining redemption value become bank funds.

16. Non-transitory computer readable medium as defined in claim 14, wherein the one or more computer programs further comprises instructions that, when executed by the one or more bank computers, cause the one or more bank computers to perform the operations of:
   determining receipt of funds from the one or more of the plurality of retail computers, the funds being in an amount of the redemption value of the one or more of the plurality of promotion cards upon expiration to define a remaining redemption value.

17. Non-transitory computer readable medium as defined in claim 14, wherein the predetermined amount is a predetermined discount amount that is less than the redemption value of the plurality of cards.

* * * * *